May 7, 1963   M. J. DIAMOND ETAL   3,089,084
MAGNETIC CRACK DETECTOR WITH VIBRATED PICKUP
Filed March 23, 1960
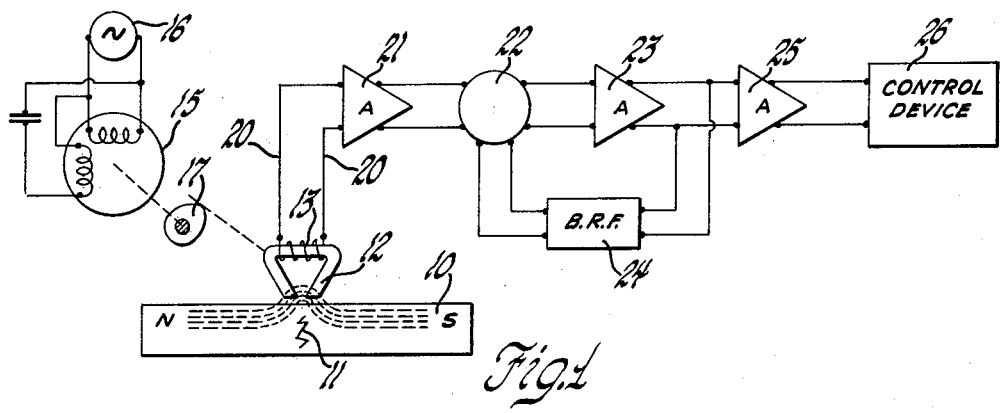
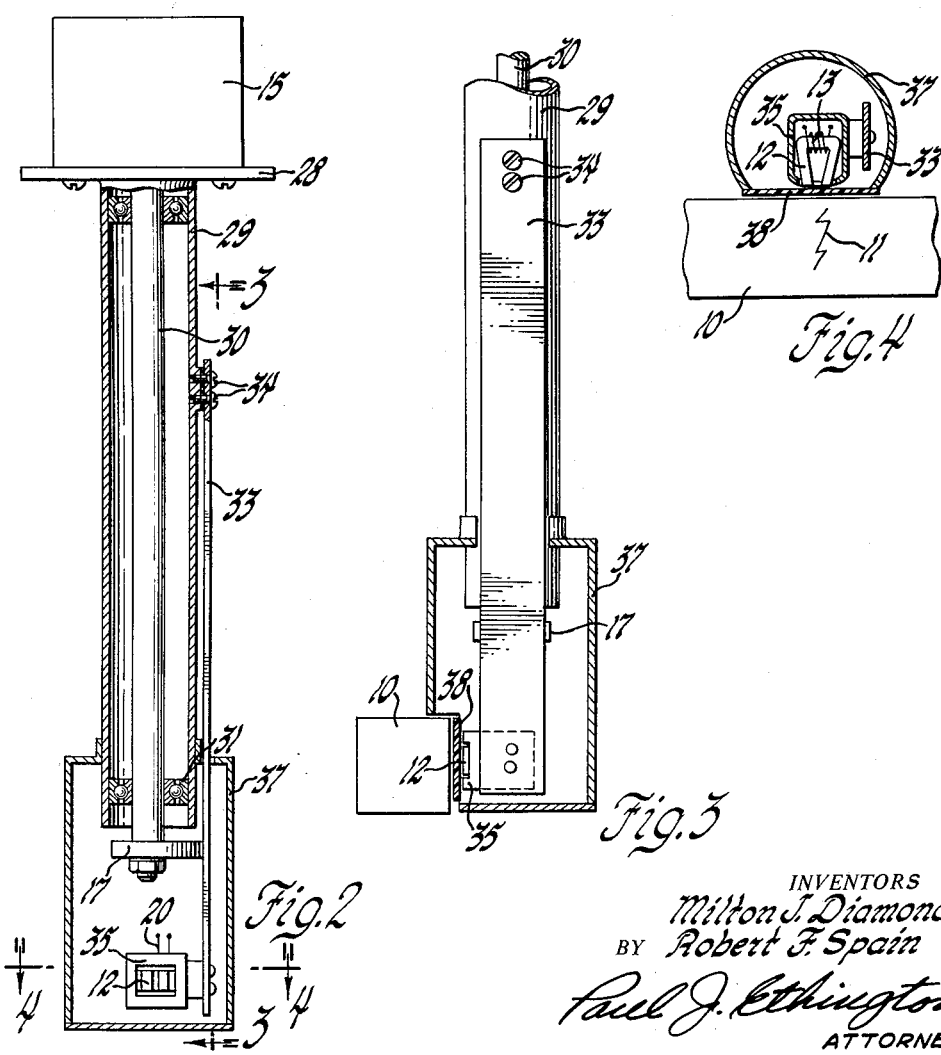
INVENTORS
Milton J. Diamond &
BY Robert F. Spain
ATTORNEY

3,089,084
MAGNETIC CRACK DETECTOR WITH VIBRATED PICKUP

Milton J. Diamond, Saginaw, and Robert F. Spain, Royal Oak, Mich., assignors to General Motors Corporation, Detroit, Mich., a corporation of Delaware
Filed Mar. 23, 1960, Ser. No. 16,980
3 Claims. (Cl. 324—37)

This invention relates to apparatus for detecting the magnitude of a magnetic field and more particularly to a vibratory pickup device for use in a magnetic flaw detector.

Many devices have been developed for detecting internal flaws in metallic castings. In one method of flaw detecting the casting or workpiece is magnetized so that magnetic flux flows along the length of the casting. If cavities or flaws are present in the workpiece, the flux will be deflected out into the surrounding area and a field will be established adjacent the workpiece. If a coil is moved past the workpiece, then the voltage induced in this coil will be a function of the field strength adjacent the flaw and the speed of movement of the coil. To provide adequate sensitivity, the rate of movement of the coil relative to the field must be great and so it is necessary in such a system to vibrate or oscillate the coil. A convenient way of obtaining this vibration is by mounting a small electric motor on a probe which contains the coil and by using an eccentric coupling or a cam arrangement between the motor and the coil to obtain the desired motion. Such an arrangement, however, presents difficulties due to the alternating magnetic field established by the power supply for the electric motor since the coil will be equally responsive to this magnetic field.

It is therefore the principal object of this invention to provide a vibratory magnetic pickup device wherein the pickup is unresponsive to stray fields caused by the power supply of the vibratory drive system. A further object is to provide a vibratory pickup probe for a magnetic flaw detection device which is easily constructed using standard components.

In accordance with this invention, a magnetic pickup coil is adapted to be vibrated or driven by an electric motor at a speed of vibration which is less than the frequency of any alternating magnetic field that may result from the supply for the motor. The voltage induced in this coil by magnetic flux linking the coil is detected by electronic means and the signals having frequencies other than that of the vibration frequency are rejected. Thus the output at the vibration frequency will be a function of the rate at which the coil is traversing the static magnetic field adjacent the coil and will not include stray fields of the supply source frequency. Further, the speed of vibration may be such that there will be little error induced by changes in the rate at which the pickup coil is moved past the workpiece.

The novel features which are believed to be characteristic of the invention are set forth with particularity in the appended claims. The invention itself, however, both as to its organization and method of operation, together with further objects and advantages thereof, may best be understood by reference to the following description, taken in conjunction with the accompanying drawing, in which:

FIGURE 1 is a diagram of apparatus incorporating the principal features of the invention;

FIGURE 2 is an elevation partly in section of the pickup probe used in the invention;

FIGURE 3 is a side view of the probe of FIGURE 2; and

FIGURE 4 is an end view of the probe of FIGURE 2.

With reference to FIGURE 1, there is shown apparatus for detecting faults in a workpiece 10 which may be a casting of a ferrous material. The workpiece must be magnetized prior to use of this flaw detection apparatus so that there will be a steady state magnetic flux in a longitudinal direction in the workpiece. A flaw or fault 11 in the interior of the workpiece 10 will cause the magnetic flux to be deflected around the fault and out of the workpiece into the surrounding atmosphere. A pickup device including a magnetic core 12 and a coil 13 is shown adjacent the workpiece in the deflected field caused by the fault 11. The pickup device includes an induction motor 15 which is driven by an A.C. supply source 16 and is wound such that it will run at a synchronous speed of half the supply source frequency. That is, if the frequency of the source 16 is 60 cycles per second (c.p.s.) and the stator of the motor 15 is wound to define two poles plus starting windings, then the synchronous speed of the motor 15 will be 1800 revolutions per minute (r.p.m.) or 30 revolutions per second (r.p.s.). The rotor shaft of the motor 15 is coupled to an eccentric device or cam 17 which is further coupled as hereinafter set forth to the magnetic core 12. The coil 13 is connected by a pair of conductors 20 to a suitable amplifying device 21 and the output of this amplifier is applied through a combining device 22 to a further amplifier 23. The output of the amplifier 23 is coupled back through a band rejection filter 24 in a subtractive relationship to the combining device 22. The band rejection filter 24 may be of the RC parallel-T configuration and is adapted to reject 30 c.p.s. signals and apply all other signals in the form of negative feedback to the input to the amplifier 23. Thus, at the input of a further amplifier 25 there will appear only signals of the vibration frequency or 30 c.p.s. The output of the amplifier 25 is applied to a utilization device 26 which may be an indicator or reject circuit.

With reference to FIGURE 2, the electric motor 15 is shown mounted on a flange 28 of a cylindrical support member or sleeve 29. A shaft 30, an extension of the rotor shaft of the motor 15, extends axially through the sleeve 29 and through a suitable bearing 31. Attached by suitable means to the end of the shaft 30 is the eccentric device or cam 17. A flat elongated spring 33 is mounted on the exterior of the sleeve 29 by suitable fastening means 34 and the free end of the spring 33 has mounted thereon a magnetic pickup 35 which includes the magnetic core 12. Also mounted on the sleeve 29 is a cylindrical shield 37 composed of copper or other conductive non-magnetic material. This shield 37 extends outwardly such that it does not restrict the path of movement of the spring 33 or the pickup 35. As shown in FIGURE 3 wherein the probe is shown in position adjacent the workpiece 10, the shield 37 includes a flattened portion in front of the face of the pickup 35 to receive the face of the workpiece 10. A shielding plate 38 is positioned between the pickup 35 and the workpiece 10 to prevent damage to the face of the pickup 35 by irregularities in the workpiece 10. This plate 38 does not distort the magnetic field since it is composed of plastic or other non-magnetic, non-conducting material.

In the operation of this invention, the probe of FIGURE 2 is moved along the workpiece 10 manually or by automatic mechanical means. So long as there are no faults within the workpiece 10, the magnetic field adjacent the workpiece will be some low constant magnitude and the control device 26 may be adjusted to be nonresponsive to signals appearing at the output of the amplifier 25 below a level corresponding to this steady state value. When the probe is adjacent a fault 11, there will be a voltage induced in the coil 13 and this voltage will have a frequency equal to the 30 c.p.s. vibration frequency. Other signals induced in the coil 13 will be eliminated by the negative feedback arrangement of the amplifier 23 and so the input to the control device 26 will be a true indication of the magnitude of the static field adjacent the workpiece and this magnitude will be related to the size of the fault 11.

As shown in FIGURE 2, the motor 15 will drive the shaft 30 and the cam 17 at 1800 r.p.m. or 30 r.p.s. The spring 33, bearing upon the cam 17, will be deflected at this rate of 30 r.p.s. The spring 33, along with the pickup 35, is selected to have a natural resonant frequency of much less than the 30 r.p.s. value so that the spring 33 will maintain contact with the cam 17. The pickup 35 will thus oscillate in an arcuate band which is approximately a straight line. In the arrangement shown, the oscillation will be in a direction parallel to the workpiece 10. Thus, the pickup will not be responsive to static magnetic flux which does not have a component in a direction perpendicular to the longitudinal axis of the workpiece.

While there has been illustrated a particular embodiment of the invention, it will of course be understood that the invention is not limited thereto since various modifications may be made by persons skilled in the art. It is contemplated that the appended claims will cover any such modifications as fall within the true scope of the invention.

We claim:

1. In a magnetic flaw detector, a probe adapted to be moved with respect to a workpiece, a yieldable member mounted on said probe, a pickup coil mounted on said yieldable member, a motor mounted on said probe and adapted to drive an eccentric member, said yieldable member bearing upon said eccentric member whereby said pickup coil will be vibrated at the speed of said motor, an alternating current source connected to said motor, said motor being wound such that the synchronous speed thereof is appreciably less than the frequency of said source, and electrical means connected to said coil to receive the signals generated therein and adapted to be responsve only to signals equal in frequency to said synchronous speed.

2. In a magnetic flaw detector, a probe adapted to be moved with respect to a workpiece, an elongated spring having one end anchored to said probe, a magnetic pickup mounted on the other end of said spring, an A.C. induction motor mounted on said probe and having a rotor shaft, a cam mounted on said shaft, said spring bearing upon the periphery of said cam whereby said pickup will be vibrated at the speed of said motor, an alternating current source connected to said motor, said motor having a winding arrangement such that the synchronous speed thereof will be appreciably less than the frequency of said source, and electrical means connected to said pickup to receive the signals generated therein and adapted to be responsive only to signals equal in frequency to said synchronous speed.

3. Apparatus according to claim 2 wherein the frequency of said source is sixty cycles per second and said synchronous speed is thirty revolutions per second.

References Cited in the file of this patent

UNITED STATES PATENTS

| | | |
|---|---|---|
| 2,617,854 | Van Valkenburg | Nov. 11, 1952 |
| 2,946,948 | Foner | July 26, 1960 |

OTHER REFERENCES

Caldecourt et al.: Rev. Sci. Instr., vol. 25, No. 10 (October 1954); pp. 953–955.